United States Patent [19]

Croteau

[11] Patent Number: 5,096,283
[45] Date of Patent: Mar. 17, 1992

[54] ADJUSTABLE REAR VIEW MIRROR EXTENSION APPARATUS

[76] Inventor: Hans Croteau, 6792 Maury Dr., San Diego, Calif. 92119

[21] Appl. No.: 512,830

[22] Filed: Apr. 23, 1990

[51] Int. Cl.$^5$ ................................................ G02B 7/18
[52] U.S. Cl. .................................... 359/865; 248/485; 359/872
[58] Field of Search ............... 350/631, 632, 634, 636, 350/612, 626; 248/479, 485

[56] References Cited

U.S. PATENT DOCUMENTS

| | | |
|---|---|---|
| 2,214,639 | 9/1940 | Lenta . |
| 2,582,651 | 1/1952 | Peterson . |
| 2,802,394 | 8/1957 | Krone . |
| 3,790,117 | 2/1974 | Winkler ............................... 350/626 |
| 3,954,328 | 5/1976 | Ames . |
| 4,111,532 | 9/1978 | Budish ............................... 350/632 |
| 4,345,819 | 8/1982 | Villa-Real . |
| 4,598,982 | 7/1986 | Levine ............................... 350/632 |
| 4,695,138 | 9/1987 | Epstein . |
| 4,715,681 | 12/1987 | Johnson ............................. 350/632 |
| 4,718,756 | 1/1988 | Lancaster . |
| 4,863,254 | 9/1989 | Dyer .................................. 350/631 |
| 4,892,400 | 1/1990 | Brookes et al. ..................... 350/632 |
| 4,921,340 | 5/1990 | Dyer .................................. 350/631 |

FOREIGN PATENT DOCUMENTS 0193694 12/1957 Austria ................................ 248/485

Primary Examiner—Bruce Y. Arnold
Assistant Examiner—Jay Ryan
Attorney, Agent, or Firm—Andsel Group; David L. Baker; Lewis Massie

[57] ABSTRACT

An adjustable rear view mirror extension apparatus that attaches to a standard existing rear view mirror found in most automobiles and other motor vehicles. The apparatus has a mirror, a mirror frame to secure the mirror, a plurality of lateral supports to position the mirror on the frame, and a flexible mirror retainer to releasingly retain the mirror in the mirror frame. There is a mirror frame support that allows the mirror to rotate on a vertical axis and a rotating device to allow the mirror to rotate on a horizontal axis. The rotating device has a housing comprising two sections. The two sections are adjustably connected to adjust the tension of the insert spring which controls the ease of movement of the mirror around its horizontal axis. The rotating device has a first and second surface with a plurality of radial bosses and grooves, respectively, included are an insert, spring and insert gripping device to restrict rotation. Thre is a bending device such as a flexible metal tubing to selectively position the mirror. The dual pivot device assists the user to move the mirror out of the way of the sun visor of a vehicle. The dual pivot device, also, allows the bending device and therefore the mirror to be adjusted on two more vertical axes. There is an attachment device which has an attachment frame and a plurality of fasteners to attach the apparatus to an existing mirror in the vehicle.

9 Claims, 1 Drawing Sheet

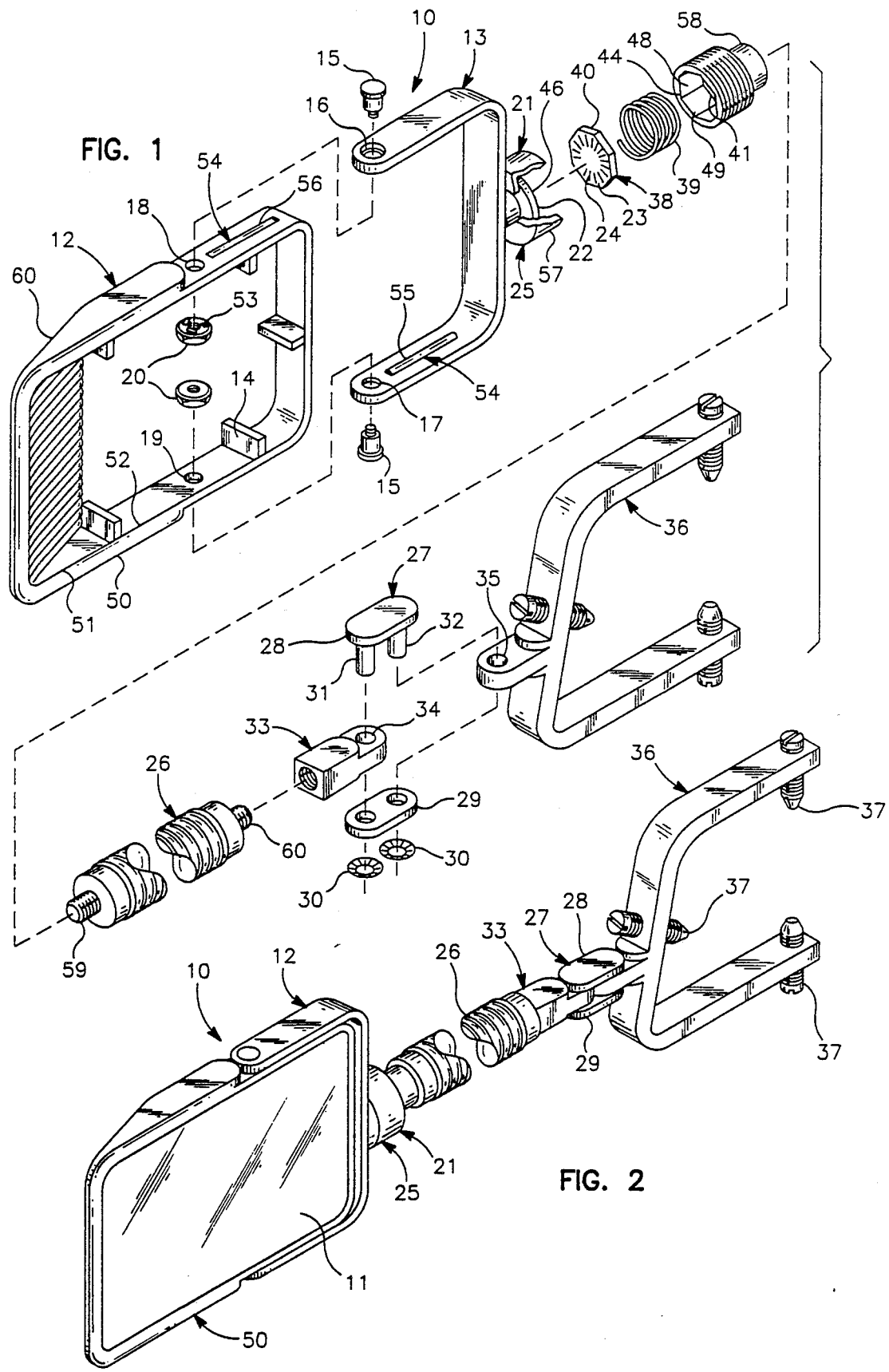

ADJUSTABLE REAR VIEW MIRROR EXTENSION APPARATUS

BACKGROUND OF THE INVENTION

1. Field of the Invention

This invention relates to an adjustable rear view mirror apparatus that attaches to a standard rear view mirror found in most automotive vehicles. The mirror apparatus provides an enhanced rear view of the area around the vehicle.

2. Description of the Related Art

There have been many rear view mirrors developed for motor vehicles. Typically these mirrors have been mounted on posts having universal joints by which the mirror could be rotated into a desired position. These mirrors were usually mounted on the inside surface of the windshield or on the door or door post on the outside of the vehicle in a position that would allow the driver to see toward and beyond the rear of the vehicle. Most mirrors provide a single plane view which often limited the area that could be viewed by the driver without moving the mirror to a different position.

Other mirrors tried to alleviate this problem of areas not observable, called "blind spots", by using a long mirror with a curved surface referred to as a "panoramic mirror". However curved surface mirrors cause distortion of the area being viewed and create problems for the drivers in determining the actual distances and the relative positions of other vehicles, shown in the mirrors, to their own vehicle.

Some older mirror designs provided extensions with flat mirror surfaces but these mirrors were arranged in a manner that required the user to move his head to observe the areas of interest. Some designs interfered with the operation of the sun visors and would not hold their selected positioning. Therefore they required constant repositioning and often blocked large portions of the front windshield to the consternation of the driver. Other examples of these extended mirrors proved to be too long and contacted the windshield before they reached a position to observe the "blind spot".

U.S. Pat. No. 2,214,639 to J. G. Lenta on Sept. 10, 1940 describes a rearvision mirror screwed into a solid base and describes pivot bars that are hingingly mounted to independently adjust two additional mirrors.

U.S. Pat. No. 2,582,651 to J. G. Peterson on Jan. 15, 1952 shows a dual vision rear view side mirror with a second mirror hingingly attached to a first mirror. The first mirror is attached to the side of the vehicle and pivots on a ball joint. A thumb screw retains the angular setting of the second mirror in relation to the first mirror.

U.S. Pat. No. 2,802,394 to M. Krone on Aug. 13, 1957 describes two auxiliary mirrors interconnected by a turnbuckle to clamp the mirrors to an existing mirror.

U.S. Pat. No. 3,954,328 to Marc L. Ames on May 4, 1976 shows a mirror extension placed on a slide track with spring-loaded rods that engage notches on the slide to adjust the extension length.

U.S. Pat. No. 4,345,819 to Antony-Euclid C. Villa-Real on Aug. 24, 1982 shows a multi-piece mirror assembly that clips onto the existing mirror. Each mirror section rotates in a preset direction which is indicated on each mirror. Each mirror is connected to a common multi-axis pivot element.

U.S. Pat. No. 4,695,138 to David Epstein on Sept. 22, 1987 describes a flat inner mirror and two outer mirrors that have a flat surface and a convex curved surface toward the outer edge of the two mirrors. The outer mirrors are hingingly adjustable.

U.S. Pat. No. 4,718,756 to Benjamin H. Lancaster on Jan. 12, 1988 shows a two-piece mirror that clips over the existing mirror and has a centrally located eccentric cam adjustment means.

None of these mirrors describe the adjustability, ease and convenience of use of the present mirror apparatus. The present invention also overcomes the problem of the needed length of the extension causing the apparatus to strike the windshield before a proper setting can be made. The present invention introduces the bending means and numerous other adjustments.

SUMMARY OF THE INVENTION

The adjustable rear view mirror extension apparatus attaches to the standard vehicular rear view mirror found attached to the inner surface of a front windshield. Since most of the recent rear view mirrors have a longer lower edge than upper edge, the preferred shape of the attachment means corresponds to the shape of one side of the existing mirror. An attachment frame, which is part of the attachment means, has a connecting rail that interconnects an upper and a lower rail. The upper rail of the attachment frame forms an angle with a connecting rail at the point of their connection. The lower rail forms another angle at its juncture with the connecting rail. The upper inner angle formed by the upper rail and connecting rail is obtuse or greater than 90 degrees and the lower inner angle formed by the lower rail and the connecting rail is acute or less than 90 degrees. The two inside angles could be manufactured with different angles, if needed, to accommodate differently shaped mirrors. The shape of the attachment frame could, of course, be changed to accommodate a mirror shape other than one matching the shape accommodated by the preferred attachment discussed above. The attachment frame may be made of a memory plastic to allow the frame to conform slightly to existing vehicle mirrors that may vary in size slightly from the norm.

In operation, the existing mirror could be removed and the mirror extension apparatus placed on the existing mirror. Then both would be remounted as a unit. In the alternative, the mirror extension apparatus could be placed on the existing mirror without removing the existing mirror. Both methods of attachment are easy and the user has the option. The choice may depend on the design of the vehicle and the space allotted around the existing mirror by the vehicle manufacturer.

To install the adjustable rear view mirror extension apparatus on an existing mirror, loosen the extension fastening means so that the attachment frame will fit around the perimeter of the existing mirror. Adjust the top and side fasteners until the attachment frame is centered around the existing mirror. Next, tighten the lower fastener until the attachment frame is securely fastened to the existing mirror.

Once the mirror extension apparatus is installed on the existing mirror, it can be adjusted to provide the rear view preferred by the user. The mirror on the mirror extension apparatus may be rotated along its longitudinal axis and rotated along its vertical axis. The adjustment of the mirror on the mirror extension apparatus may be further refined by rotating the mirror on one of the vertical axes of the dual pivot means attached to the outer perimeter of the frame of the attachment means and to the bending means (flexible metal tubing). The flexible metal tubing can be bent into many positions to refine the positioning of the mirror. The existing mirror still retains all of its characteristic adjustments which, in combination with the adjustments of the mirror extension apparatus, adds a myriad of planes that the mirror surface may face. The beveled fingergrip portion on one end of the mirror frame has a rippled surface that provides the user with a more stable gripping surface.

An adjustable mirror apparatus to place on an existing mirror is described that has a mirror and a mirror frame means to secure the mirror. The apparatus has a mirror frame support means hingingly connected to the mirror frame that allows the mirror to rotate around a vertical axis of the mirror and has a rotating means connected to the mirror frame support means to rotate the mirror around a longitudinal axis of the mirror. There is a bending means attached to the rotating means to selectively position the mirror and a dual pivot means connected to the bending means. In the preferred embodiment, the bending means is a flexible metal tubing with a plastic covering that may be bent into various configurations. The bending means may be rotated on a first vertical axis and on a second vertical axis of the dual pivot means. The apparatus has an attachment means connected to the dual pivot means to attach the dual pivot means to the existing mirror.

There may be a locking means that has a first part on the mirror frame support means and a second part on the mirror frame means. The first part may be an elongated boss and the second part may be an elongated groove.

The rotating means may have a disk connected to the mirror frame support means. The disk may have a first surface having a plurality of radial bosses thereon and there may be a second surface on an insert that has a plurality of radial grooves thereon that intimately engages radial bosses on the first surface. The radial bosses and radial grooves may abut radially when the first and second surfaces abut to restrict the rotation of the first surface in relation to the second surface.

There may be a spring that has one end intimately engaged with a rear surface of the insert to bias the second surface of the insert toward the first surface of the disk. There may be a housing that has a first section and a second section. The second section may be adjustably connected to the first section.

There may be an inner chamber in the housing to house the disk, the insert and the spring. There may be a spring abutment surface in the inner chamber and the other end of the spring may abut the spring abutment surface. There may be an insert gripping means on a circumference of the inner chamber to restrict rotation of the insert.

The bending means may be a flexible tubing attached to the rotating means to selectively position the mirror. The attachment means may comprise an attachment frame connected to the dual pivot means to support the dual pivot means and there may be a plurality of fastening means on the attachment frame to fasten the attachment frame to the existing mirror.

The mirror frame means may have a lateral support means in the mirror frame means to position the mirror on the mirror frame means. There may be a flexible mirror retaining means to releasingly retain the mirror in the mirror frame means. The flexible mirror retaining means may be a rubber-like lip around the perimeter of the mirror frame means that has a lip and groove into which the mirror fits snugly.

The mirror frame means may have a beveled fingergrip portion on one end that allows the adjustable mirror apparatus a greater circumference of swing toward the windshield of the vehicle. The beveled edge allows the user to swing the mirror apparatus closer to the windshield of the vehicle. This provides greater adjustment and an increased field of vision.

It is therefore an object of this invention to provide an adjustable rear view mirror extension apparatus to enhance the users view of the area behind and to the sides of the vehicle upon which it is placed.

It is an object of this invention to provide a mirror extension that provides an adjustable extension to the existing mirror on the vehicle.

It is another object to provide a mirror extension that may be easily removed and transferred from one vehicle to another without removing the existing mirror from the vehicle.

BRIEF DESCRIPTION OF THE DRAWINGS

FIG. 1 is an exploded perspective view of the adjustable rear view mirror extension apparatus without the mirror to show the area behind the mirror.

FIG. 2 is an assembled perspective view of the adjustable rear view mirror extension apparatus.

DESCRIPTION OF THE PREFERRED EMBODIMENT

Referring to FIGS. 1 and 2, an adjustable rear view mirror extension apparatus 10 is shown. An adjustable mirror apparatus 10 that is placed on an existing mirror (not shown) has a mirror 11 and a mirror frame means 12 to enclose and support the mirror 11. There are a plurality of lateral support means 14 in the mirror frame means 12 to position the mirror 11 on the mirror frame means 12. There is a flexible mirror retaining means 50 to releasingly retain the mirror 11 in the mirror frame means 12. The flexible mirror retaining means 50 may be made of a rubber-like material that fits around the perimeter of the mirror frame means and that has a lip 51 and a groove 52 into which the mirror 11 is snugly and releasingly placed.

A mirror frame support means 13 is hingingly connected to the mirror frame means to allow the mirror 11 to rotate around a vertical axis (not shown) of the mirror 11. The mirror frame means 12 hinges on two hinge bolts 15 which pass through ports 16 and 17 on the mirror frame support means 13 and then through ports 18 and 19 in the mirror frame means 12. The hinge bolts 15 may be secured by nuts 20 that have bosses 53 to reduce the change of the nuts working loose after they are secured tightly in position. There is a locking means 54 having a first part or an elongated boss 55 and a second part or elongated groove 56. The boss 55 and the groove 56 intimately engage each other as the mirror frame means 12 is aligned with the mirror frame support means 13 assuring that there is a positive positioning of the mirror frame means 12 in the mirror frame support means 13. The boss 55 is displaced from the groove 56 by grasping the mirror frame support means 13 and rotating the mirror frame means 12 around its vertical axis.

There is a rotating means 21. Comprising the rotating means 21 is a disk 46 connected to the mirror frame support means 13 that allows the mirror 11 to rotate around a longitudinal axis of the mirror 11. There is a first surface 22 on the disk 46 that has a plurality of radial bosses thereon (not shown). There is a second surface 23 on an insert 38 that has a plurality of radial grooves 24 thereon that intimately engage the radial bosses on first surface 22. The radial bosses and the radial grooves 24 abut each other when the first surface 22 and second surface 23 abut to restrict the rotation of the first surface 22 in relation to the second surface 23.

A spring 39 has one end 42 that is intimately engaged with a rear surface 40 of the insert 38 to bias the second surface 23 of the insert 38 toward the first surface 22 of the disk 46. There is a housing 25 that has a first section 57 and a second section 58. The second section 58 is adjustably connected to first section 57 to allow the user to adjust the tension of spring 39. This adjustment determines the ease of turning the mirror 11 via the rotating means 21. There is an inner chamber 48 in the housing 25 to house the disk 46, the insert 38 and the spring 39. There is a spring abutment surface 41 in the inner chamber 48. An other end 43 of the spring 39 abuts the spring abutment surface 41. There is an insert gripping means 44 on a circumference 49 of the chamber 48 to selectively grip the insert 38 and restrict rotation of the insert 38. The chamber 48 in housing 25 has enough depth to allow spring 39 and insert 38 to move along a portion of the length of the chamber 48. When the mirror frame means 12 and mirror frame support means 13 are turned, the bosses (not shown) are forced out of the grooves 24 and the insert 38 is forced back away from disk 46 and along inner chamber 48. At that time, the mirror frame means 12 and the mirror support 13 may be rotated to the selected position and then the bosses are allowed to reengage the grooves and the insert moves back toward the disk.

A bending means 26 which is shown as flexible metal tubing 26 is connected at one end 59 to the housing 58. The bending means 26 further comprises adapter 33 and adapter port 34. Adapter 33 is connected to the flexible metal tubing 26 at an other end 60 to selectively position the mirror 11. There is a dual pivot means 27 which consists of link 28, link cap 29 and link fasteners 30 connected to the flexible metal tubing 26 via the adapter 33. The leg 31 of the dual pivot means 27 is pivotally mounted in adapter port 34 of adapter 33. This provides a first vertical axis for the flexible metal tubing 26 to rotate upon. The leg 32 of the dual pivot means 27 is pivotally mounted in the attachment frame port 35. This provides a second vertical axis for the flexible metal tubing to rotate upon. An attachment frame 36 is connected to the dual pivot means 27 and there are a plurality of fastening means such as the screw fasteners 37 on the attachment frame 36 to fasten the attachment frame 36 to the existing mirror (not shown).

The foregoing descriptions and drawings of the invention are explanatory and illustrative only, and various changes in shape, sizes and arrangements of parts as well certain details of the illustrated construction may be made within the scope of the appended claims without departing from the true spirit of the invention.

I claim:

1. An adjustable mirror apparatus to place on an existing mirror comprising:
   a. a mirror;
   b. a mirror frame means to secure the mirror;
   c. a mirror frame support means hingingly connected to the mirror frame that allows the mirror to rotate around a vertical axis of the mirror;
   d. a rotating means connected to the mirror frame support means to rotate the mirror around a longitudinal axis of the mirror;
   e. a bending means attached to the rotating means to selectively position the mirror;
   f. a dual pivot means connected to the bending means to allow the bending means to rotate on a first vertical axis and on a second vertical axis; and
   g. an attachment means connected to the dual pivot means to attach the dual pivot means to the existing mirror.

2. An adjustable mirror apparatus as described in claim 1 further comprising a locking means having a first part on the mirror frame support means and a second part on the mirror frame means.

3. An adjustable mirror apparatus as described in claim 2 wherein the first part is an elongated boss and the second part is an elongated groove.

4. An adjustable mirror apparatus as described in claim 1 wherein the rotating means further comprises:
   a. a disk connected to the mirror frame support means;
   b. a first surface having a plurality of radial bosses thereon;
   c. a second surface on an insert having a plurality of radial grooves thereon that intimately engages radial bosses on the first surface;
   d. the radial bosses and radial grooves abutting radially when the first and second surfaces abut to restrict the rotation of the first surface in relation to the second surface;
   e. a spring having one end intimately engaged with a rear surface of the insert to bias the second surface of the insert toward the first surface of the disk;
   f. a housing having a first section and a second section adjustably connected to the first section;
   g. an inner chamber in the housing to house the disk, the insert and the spring;
   h. a spring abutment surface in the inner chamber;
   i. an other end of the spring abutting the spring abutment surface; and
   j. an insert gripping means on a circumference of the inner chamber to restrict rotation of the insert.

5. An adjustable mirror apparatus as described in claim 1 wherein the bending means further comprises a flexible tubing.

6. An adjustable mirror apparatus as described in claim 1 wherein the attachment means further comprises:
   a. an attachment frame connected to the dual pivot means to support the dual pivot means; and
   b. a plurality of fastening means on the attachment frame to fasten the attachment frame to the existing mirror.

7. An adjustable mirror apparatus as described in claim 1 wherein the mirror frame means further comprises:
   a. a lateral support means in the mirror frame means to position the mirror on the mirror frame means; and
   b. a flexible mirror retaining means to releasingly retain the mirror in the mirror frame means.

8. An adjustable mirror apparatus to place on an existing mirror comprising:
   a. a mirror;
   b. a mirror frame means to enclose and support the mirror;

c. a mirror frame support means hingingly connected to the mirror frame that allows the mirror to rotate around a vertical axis of the mirror;
d. a locking means having a first part on the mirror frame support means and a second part on the mirror frame means;
e. a disk connected to the mirror frame support means;
f. a first surface having a plurality of radial bosses thereon;
g. a second surface on an insert having a plurality of radial grooves thereon that intimately engages radial bosses on the first surface;
h. the radial bosses and radial groove abutting radially when the first and second surfaces abut to restrict the rotation of the first surface in relation to the second surface;
i. a spring having one end intimately engaged with a rear surface of the insert to bias the second surface of the insert toward the first surface of the disk;
j. a housing having a first section and a second section adjustably connected to the first section;
k. an inner chamber in the housing to house the disk, the insert and the spring;
l. a spring abutment surface in the inner chamber;
m. an other end of the spring abutting the spring abutment surface; and
n. an insert gripping means on a circumference of the inner chamber to restrict rotation of the insert;
o. a flexible tubing connected to an other end of the housing to selectively position the mirror;
p. a dual pivot means connected to the flexible tubing to allow the flexible tubing to rotate on a first vertical axis and on a second vertical axis; and
q. an attachment means connected to the dual pivot means to attach the dual pivot means to the existing mirror.

9. An adjustable mirror apparatus to place on an existing mirror comprising:
a. a mirror;
b. a mirror frame means to enclose and support the mirror;
c. a lateral support means in the mirror frame means to position the mirror on the mirror frame means;
d. a flexible mirror retaining means to releasingly retain the mirror in the mirror frames means;
e. a mirror frame support means hingingly connected to the mirror frame that allows the mirror to rotate around a vertical axis of the mirror;
f. a locking means having an elongated boss on the mirror frame support means and an elongated groove on the mirror frame means;
g. a disk connect to the mirror frame support means;
h. a first surface having a plurality of radial boss thereon;
i. a second surface on an insert having a plurality of radial grooves thereon that intimately engages radial bosses on the first surface;
j. the radial bosses and radial grooves abutting radially when the first and second surfaces abut to restrict the rotation of the first surface in relation to the second surface;
k. a spring having one end intimately engaged with a rear surface of the insert to bias the second surface of the insert toward the first surface of the disk;
l. a housing having a first section and a second section adjustably connected to the first section;
m. an inner chamber in the housing to house the disk, the insert and the spring;
n. a spring abutment surface in the inner chamber;
o. an other end of the spring abutting the spring abutment surface; and
p. an insert gripping means on a circumference of the inner chamber to restrict rotation of the insert;
q. a flexible tubing connected to an other end of the housing to selectively position the mirror;
r. a dual pivot means connected to the flexible tubing to allow the flexible tubing to rotate on a first vertical axis and on a second vertical axis;
s. an attachment frame connected to the dual pivot means to support the dual pivot means;
t. a plurality of fastening means on the attachment frame to fasten the attachment frame to the existing mirror; and
u. the mirror frame means having a beveled fingergrip portion on one end.

* * * * *